(12) United States Patent
Otsuki et al.

(10) Patent No.: US 7,498,704 B2
(45) Date of Patent: Mar. 3, 2009

(54) MOTOR

(75) Inventors: Takaya Otsuki, Kyoto (JP); Masahiro Ishikawa, Kyoto (JP); Takamasa Yamashita, Kyoto (JP); Naoto Yamaoka, Kyoto (JP); Yuji Yabuuchi, Kyoto (JP); Kazuhiro Inouchi, Kyoto (JP); Makoto Fujihara, Kyoto (JP)

(73) Assignee: Nidec Corporation, Kyoto (JP)

( * ) Notice: Subject to any disclaimer, the term of this patent is extended or adjusted under 35 U.S.C. 154(b) by 72 days.

(21) Appl. No.: 11/670,433

(22) Filed: Feb. 2, 2007

(65) Prior Publication Data

US 2007/0176504 A1 Aug. 2, 2007

(30) Foreign Application Priority Data

Feb. 2, 2006 (JP) ............................. 2006-026417

(51) Int. Cl.
*H02K 7/09* (2006.01)
(52) U.S. Cl. .................................................. 310/90.5
(58) Field of Classification Search ................ 310/90.5, 310/90, 67 R, 43
See application file for complete search history.

(56) References Cited

U.S. PATENT DOCUMENTS

| | | | |
|---|---|---|---|
| 3,934,950 A * | 1/1976 | Kuhlmann ................. 310/90.5 |
| 4,755,709 A | 7/1988 | De Jager | |
| 5,453,650 A | 9/1995 | Hashimoto et al. | |
| 5,938,343 A * | 8/1999 | Grantz et al. ................ 384/152 |
| 6,020,664 A | 2/2000 | Liu et al. | |
| 6,031,651 A | 2/2000 | Nakasugi | |
| 6,246,140 B1 | 6/2001 | Horng | |
| 6,544,011 B2 | 4/2003 | Hsieh | |
| 6,680,814 B2 | 1/2004 | Nii et al. | |
| 6,756,714 B2 | 6/2004 | Alex et al. | |
| 6,882,074 B2 * | 4/2005 | Horng et al. ................... 310/90 |
| 6,954,017 B2 * | 10/2005 | Takahashi et al. ............. 310/85 |
| 7,015,612 B2 * | 3/2006 | Fujinaka et al. ............ 310/90.5 |
| 7,109,620 B2 * | 9/2006 | Fujii et al. ..................... 310/90 |
| 2004/0132881 A1 | 7/2004 | Okamiya et al. | |
| 2004/0232781 A1 | 11/2004 | Yoo | |
| 2005/0023907 A1 | 2/2005 | Neal | |
| 2005/0031237 A1 | 2/2005 | Gomyo et al. | |
| 2005/0116564 A1 | 6/2005 | Tokunaga et al. | |
| 2005/0140225 A1 | 6/2005 | Fujinaka et al. | |
| 2005/0184609 A1 | 8/2005 | Chen et al. | |
| 2005/0264117 A1 | 12/2005 | Hata et al. | |

(Continued)

FOREIGN PATENT DOCUMENTS

JP  S52-095010  8/1977

(Continued)

*Primary Examiner*—Dang D Le
(74) *Attorney, Agent, or Firm*—Volentine & Whitt, PLLC

(57) ABSTRACT

A motor includes a rotor and a stator. A shaft of the rotor is received in a sleeve. A face of the sleeve and a face of the shaft, that are opposed to each other, form a bearing supporting the rotor in a rotatable manner relative to the stator. A sleeve-retaining portion that retains the sleeve has a bottom portion opposed to an axial end of the sleeve. A magnet holder is arranged in the bottom portion to accommodate an attracting magnet magnetically attracting the axial end of the shaft. The magnet holder is held between the axial end of the sleeve and the bottom portion of the sleeve-retaining portion.

28 Claims, 8 Drawing Sheets

U.S. PATENT DOCUMENTS

2006/0131972 A1   6/2006   Yang et al.

FOREIGN PATENT DOCUMENTS

| JP | S55-123019 A | 9/1980 |
|----|----|----|
| JP | H01-176215 U | 12/1989 |
| JP | H04-075443 A | 3/1992 |
| JP | 2620393 B2 | 3/1997 |
| JP | H09-200995 A | 7/1997 |
| JP | H09-317755 A | 12/1997 |
| JP | H10-127004 A | 5/1998 |
| JP | 2856027 B2 | 11/1998 |
| JP | 2000-245101 A | 9/2000 |
| JP | 2000245101 A | 9/2000 |
| JP | 2000-306319 A | 11/2000 |
| JP | 2001-050250 A | 2/2001 |
| JP | 2001050250 A | 2/2001 |
| JP | 2001-093223 A | 4/2001 |
| JP | 2002-257133 A | 9/2002 |
| JP | 2002-345204 A | 11/2002 |
| JP | 2004-023828 A | 1/2004 |
| JP | 2005-192262 A | 7/2005 |
| JP | 2006-177406 A | 7/2006 |
| WO | WO-03/107513 A1 | 12/2003 |

* cited by examiner

MOTOR

BACKGROUND OF THE INVENTION

1. Technical Field

The present invention relates to a motor including a sliding bearing formed by an outer surface of a rotatable shaft inserted through a sleeve and an inner surface of the sleeve.

2. Description of the Related Art

Many electronic devices include a fan motor or a motor for rotating a disk-shaped storage medium. Some of motors that can be used in the electronic devices include a sliding bearing. For example, the sliding bearing is formed by a sleeve and a shaft inserted into the sleeve. The sleeve supports the shaft in a rotatable manner around a rotation axis. A thrust plate provided at a bottom of the sleeve supports a lower end of the shaft in a slidable manner thereon. In another structure, the shaft is magnetically supported in an axial direction parallel to the rotation axis, that is, is supported in a non-contact manner.

In the above bearing structure, a rotor of the motor, including the shaft, can move in the axial direction with respect to the sleeve. This axial movement of the rotor makes rotation of the rotor unstable, causing generation of noises or sliding loss. In order to avoid this trouble, there are proposed various arrangements for restricting the axial movement of the rotor.

In one exemplary arrangement, a magnet is provided on a rear face of the thrust plate, i.e., a face of the thrust plate opposite to the face on which the shaft is slidable. The magnet magnetically attracts the shaft formed of magnetic material toward the thrust plate. (See Japanese Unexamined Patent Publication No. H09-317755, for example.)

In another exemplary arrangement that is similar to the above arrangement, a cup-shaped back yoke formed of magnetic material is provided in addition to the magnetically attracting magnet. (See Japanese Unexamined Patent Publication No. 2000-245101, for example.) This arrangement is advantageous in that a satisfactory magnitude of a magnetically attractive force can be obtained even by an inexpensive magnet and a leakage flux from the magnetically attracting magnet can be prevented.

In the latter arrangement, the back yoke is detachably fitted and fixed to a bearing holder so as to allow adjustment of the magnetically attractive force. Therefore, when an excessively large impact is applied downward from the shaft, the back yoke may be separated from the bearing holder. For this reason, applications of motors using the latter arrangement are limited to the use in environments in which no impact is applied to the motors from outside, or those motors or electronic devices employing those motors have to include an impact-resistant structure that can prevent application of impact to the back yoke, thus making motor structures complicated. Due to the above, the latter arrangement for magnetic attraction using the back yoke has not been widely used.

BRIEF SUMMARY OF THE INVENTION

According to preferred embodiments of the present invention, a motor is provided. The motor includes: a rotor including a shaft rotatable around a rotation axis; a stator that faces the rotor; a sleeve arranged along the rotation axis and receiving the shaft, a face of the sleeve and a face of the shaft that are opposed to each other forming together a bearing supporting the rotor in a rotatable manner relative to the stator; a sleeve-retaining portion arranged along the rotation axis to retain the sleeve and having a bottom portion opposed to an axial end of the sleeve; an attracting magnet opposed to an axial end of the shaft and magnetically attracting the axial end of the shaft; and a magnet holder arranged in the bottom portion of the sleeve-retaining portion and accommodating the attracting magnet. In the motor, the axial end of the sleeve and the bottom portion of the sleeve-retaining portion restrict axial movement of the magnet holder.

In the motor, the bottom portion of the sleeve-retaining portion may have a recess that accommodates the magnet holder therein. The magnet holder may have a cup-shaped portion and a flange that extends from an opening end of the cup-shaped portion and is opposed to the axial end of the sleeve. The flange may be in contact with the axial end of the sleeve to position the sleeve in an axial direction parallel to the rotation axis.

A shaft side face of the attracting magnet, a sleeve side face of the flange of the magnet holder, and at least part of a sleeve side face of the bottom portion of the sleeve-retaining portion may be arranged in the same plane.

The motor may further include an intermediate plate arranged between the flange of the magnet holder and the axial end of the sleeve. The intermediate plate may be a thrust plate on which the axial end of the shaft is slidable or a retaining plate. In a case of the retaining plate, the retaining plate is received in a reduced thickness portion of the shaft provided near the axial end of the shaft, thereby restricting axial movement of the axial end of the shaft in a direction away from the attracting magnet. The reduced thickness portion has a smaller outer diameter than that of a remaining portion of the shaft.

In the motor, an interposed member may be arranged along the rotation axis between the sleeve and the sleeve-retaining portion. The interposed member is provided with a reduced thickness portion at its axial end next to the bottom portion of the sleeve-retaining portion, an outer diameter of the interposed member being smaller in the reduced thickness portion than in a remaining portion thereof. Moreover, the magnet holder includes a fitting portion that extends from the flange toward another axial end of the interposed member and can be fitted into the reduced thickness portion of the interposed member.

A face of a bottom of the cup-shaped portion of the magnet holder, opposite to a face next to the attracting magnet, may be uncovered.

The motor may further include a thrust plate arranged between the attracting magnet and the axial end of the shaft. The thrust plate is accommodated within the magnet holder. Alternatively, the thrust plate is arranged to cover the attracting magnet and at least a part of a sleeve side face of the bottom portion of the sleeve-retaining portion.

It is preferable that the sleeve be formed from porous metal containing lubricant therein. It is more preferable that the motor may further include a lubricant-retaining piece that contains the lubricant therein and is arranged to be in close contact with the sleeve. The lubricant-retaining piece is preferably accommodated in a space formed between a reduced thickness portion of the sleeve that is formed at or near the axial end of the sleeve and has a smaller outer diameter than that of a remaining portion of the sleeve, and the sleeve-retaining portion.

It is preferable that the motor further include a shaft-retaining structure arranged near another axial end of the shaft. The shaft-retaining structure includes a first portion formed around the other axial end of the shaft and a second portion arranged outside the first portion in a radial direction perpendicular to the rotation axis. The second portion extends from an end of the stator toward the first portion. The first and second portions can prevent movement of the shaft away from the magnet holder by engaging with each other.

The motor may further include an impeller attached to another axial end of the shaft and generating an air flow by its rotation.

The shaft may be formed of magnetic material or non-magnetic material. In a case of using the non-magnetic material, a magnetic member formed of magnetic material is attached to the axial end of the shaft.

It is preferable that the magnet holder be formed of magnetic material to enhance a magnetic force of the attracting magnet. In a case where an impeller generating an air flow by its rotation is attached to a lower axial end of the shaft and an upper axial end of the shaft is magnetically attracted by the attracting magnet, a total magnetic force provided by the attracting magnet and the magnet holder is larger than a load corresponding to a total of a weight of the impeller and an impelling force generated by the rotation of the impeller.

Other features, elements, advantages and characteristics of the present invention will become more apparent from the following detailed description of preferred embodiments thereof with reference to the attached drawings.

BRIEF DESCRIPTION OF THE SEVERAL VIEWS OF THE DRAWINGS

The following is a brief description of the drawings in which like parts bear like reference numerals and in which.

DETAILED DESCRIPTION OF THE INVENTION

Figure 1:
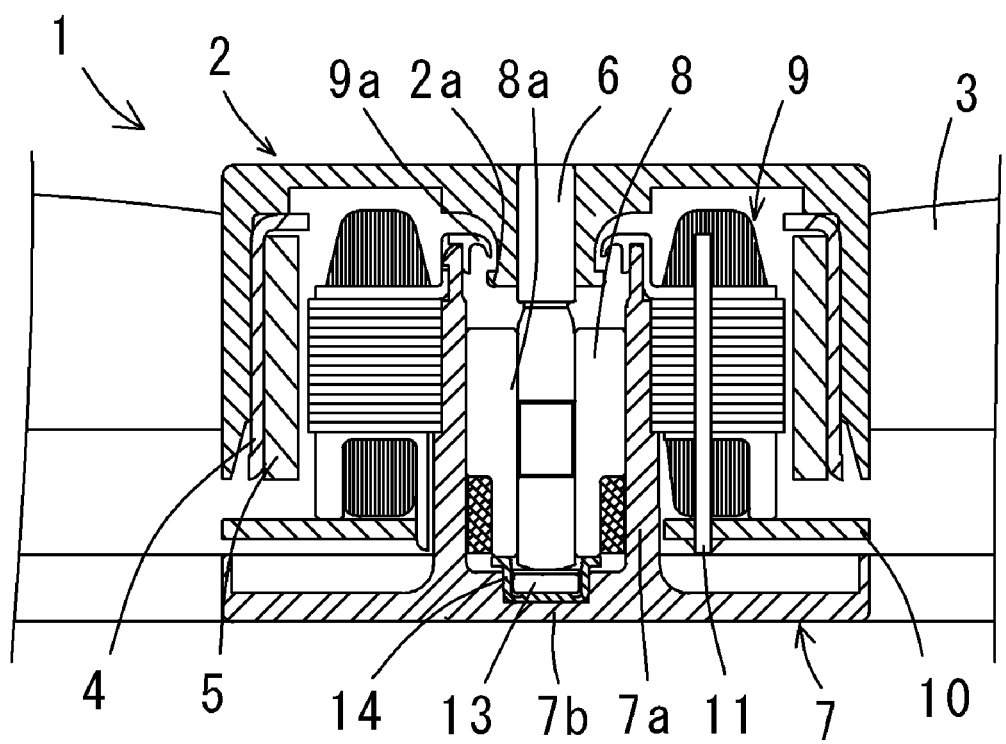
FIG. 1 is a cross-sectional view of a fan motor according to a first preferred embodiment of the present invention.

Referring to FIGS. 1 through 7, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

Although preferred embodiments of the present invention will be now described by referring to a fan motor, the present invention is not limited thereto.

First Preferred Embodiment

Figure 2:
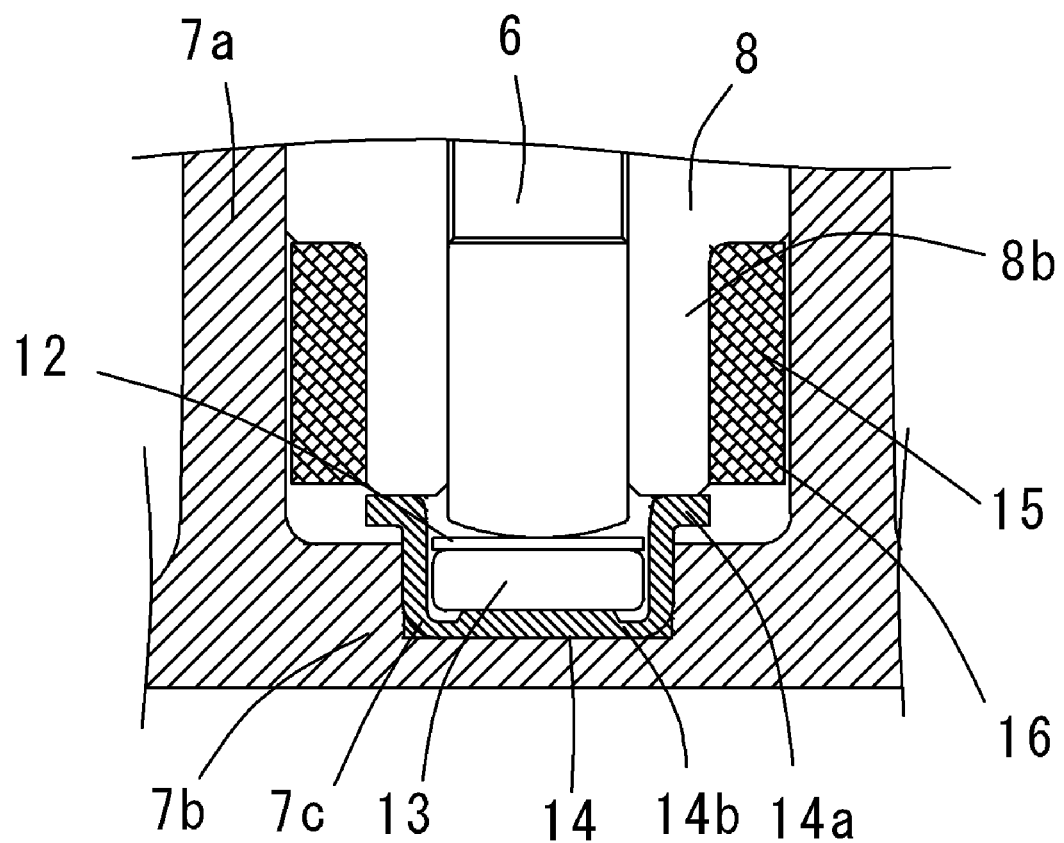
FIG. 2 is an enlarged cross-sectional view of a main part of the fan motor of FIG. 1.

FIG. 1 is a cross-sectional view of a fan motor according to a first preferred embodiment of the present invention. FIG. 2 is an enlarged cross-sectional view of a main part of the fan motor of FIG. 1.

A fan motor 1 includes a rotor and a stator. The rotor includes a shaft 6 rotatable around a rotation axis and arranged along the rotation axis. An impeller 2 is attached to one axial end (an upper axial end in FIG. 1) of the shaft 6 of the rotor. The impeller 2 includes a cup-shaped portion open downward. The impeller 2 is provided with a plurality of blades 3 on an outer peripheral surface of the cup-shaped portion and generates an air flow by its rotation. The rotor also includes a cylindrical rotor yoke 4 formed of magnetic material and a cylindrical rotating magnet 5. The rotor yoke 4 is arranged on an inner peripheral surface of the cup-shaped portion. The rotating magnet 5 is arranged on an inner circumferential surface of the rotor yoke 4. The shaft 6 is attached at its upper axial end to a center of the cup-shaped portion of the impeller 2. The shaft 6 is formed of magnetic material, e.g., iron. The impeller 2 is formed from synthetic resin by insertion molding together with the shaft 6.

The fan motor 1 also includes a frame 7 arranged on another axial end side, i.e., a lower axial end side of the shaft 6. That is, the impeller 2 and the frame 7 are arranged on the sides of the shaft 6 in the axial direction, respectively. The frame 7 includes a plate-like portion in the form of a circular plate which is opposed to a lower side of the impeller 2 in the axial direction. The frame 7 also includes a cylindrical sleeve-retaining portion 7a arranged at a center of the plate-like portion. The sleeve-retaining portion 7a has a bottom portion 7b and extends in the axial direction. A cylindrical sleeve 8 arranged along the axial direction is retained in the sleeve-retaining portion 7a. The sleeve 8 receives the shaft 6 therein and forms together with the shaft 6 a sliding bearing. When assembled, the sleeve 8 is press-fitted into the sleeve-retaining portion 7a and is securely fixed to an inner circumferential surface of the sleeve-retaining portion 7a. The sleeve 8 is formed from porous metal which is obtained by sintering magnetic powders and which contains lubricant therein. The frame 7 is formed together with a housing (not shown) that surrounds the impeller 2 to form a passage for an air flow, by molding synthetic resin as one part. The frame 7 may be formed of metal or rigid resin.

The stator 9 is fitted and fixed to an outer circumferential surface of the cylindrical sleeve-retaining portion 7a. The stator 9 is formed by a stator core including lamination of a plurality of silicon sheets and a coil wound around the stator core with an insulator interposed therebetween. The insulator is formed of synthetic resin. The coil is electrically connected to a circuit board 10 arranged below the stator 9 via conductive pins 11. Lead wires (not shown) for electric connection with an external power supply are drawn from the circuit board 10.

At a center of the sleeve 8, a through hole 8a through which the shaft 6 is inserted is formed. A face of the sleeve 8 and a face of the shaft 6 that are opposed to each other form a sliding bearing together. That is, an inner surface of the sleeve 8 defining the through hole 8a and an outer circumferential surface of the shaft 6 form a sliding bearing. When the shaft 6 is inserted into the through hole 8a, lubricant contained in the sleeve 8 leaks out of the inner surface of the sleeve 8 and reduces friction between the sleeve 8 and the shaft 6. Thus, the shaft 6 is supported to be rotatable relative to the sleeve 8.

Around the shaft 6, the impeller 2 includes an increased thickness portion 2a provided near the end of the shaft 6 attached to the impeller 2. The increased thickness portion 2a is arranged in such a manner that, when the shaft 6 and the impeller 2 move up, that is, away from the attracting magnet 13 and the frame 7, the increased thickness portion 2a can engage with a projection 9a formed by a part of the insulator of the stator 9 which extends inward in a radial direction, that is, toward the rotation axis. The increased thickness portion 2a and the projection 9a form a structure for retaining the shaft 6 with respect to the sleeve 8.

A recess 7c is formed in the bottom portion 7b of the cylindrical sleeve-retaining portion 7a. The recess 7c is open toward the shaft 6 and has a circular cross-section when seen from above. The bottom portion 7b is opposed to a lower axial end of the shaft 6 and a lower axial end of the sleeve 8. In the recess 7c in the bottom portion 7b is arranged a cup-shaped magnet holder 14.

The magnet holder 14 is formed by pressing a metal plate made of magnetic material, e.g., iron. The magnet holder 14 in cludes a cup-shaped portion 14b and a flange 14a. The cup-shaped portion 14b accommodates a magnetically attracting magnet 13 (hereinafter, referred to as attracting magnet) therein and surrounds a lower end and an outer peripheral surface of the attracting magnet 13. The attracting magnet 13 will be described later. The flange 14a extends from an opening end of the cup-shaped portion 14b outward in the radial direction to be opposed to the lower axial end of the sleeve 8, as shown in FIG. 2. The magnet holder 14 is press-fitted to the bottom portion 7b of the frame 7 within the recess 7c, is positioned in the axial direction by contact at the bottom of the recess 7c between the bottom of the cup-shaped portion 14b and the bottom portion 7b of the frame 7, and is fixed to the bottom portion of the frame 7 within the recess 7c. The press fit and fixing of the magnet holder 14 results in the magnet holder 14 being stably held in the bottom portion 7b of the sleeve-retaining portion 7a. Moreover, the magnet holder 14 can be kept stationary once being placed in the recess 7c during assembly of the fan motor 1. Thus, workability is good in the present embodiment.

The magnet holder 14 accommodates a circular magnetically-attracting magnet 13 for magnetically attracting the shaft 6. A thrust plate 12 (intermediate member) is also accommodated in the magnet holder 14 and is arranged between the attracting magnet 13 and the lower axial end of the shaft 6. Thus, the thrust plate 12 supports the lower axial end of the shaft 6 above the attracting magnet 13 to be slidable on the thrust plate 12. The magnet holder 14 is in contact with at least a lower end face of the attracting magnet 13. Therefore, the magnet holder 14 is magnetically attracted toward the attracting magnet 13 strongly and serves as a back yoke enhancing a magnetic force of the attracting magnet 13.

The thrust plate 12 is formed of wear-resistant resin and has a circular shape having a diameter smaller than an inner diameter of the magnet holder 14. The thrust plate 12 is in close contact with the attracting magnet 13 with lubricant interposed therebetween by surface tension of the lubricant acting on both the thrust plate 12 and the attracting magnet 13. The lubricant between the thrust plate 12 and the attracting magnet 13 is the same as that contained in the sleeve 8 in the present embodiment. The total thickness of the attracting magnet 13 and the thrust plate 12 in the axial direction is sufficiently smaller than a depth of the magnet holder 14 in the axial direction. Therefore, the thrust plate 12 hardly moves in a lateral direction, i.e., the radial direction. Moreover, the magnet holder 14 can prevent leakage of a magnet flux to the outside of the frame 7 because the magnet holder 14 surrounds the lower end face and the outer peripheral surface of the attracting magnet 13.

The attracting magnet side end of the shaft 6 is magnetically attracted toward the attracting magnet 13, that is, downward in FIG. 1. That end of the shaft 6 slides on the thrust plate 12 with an axially downward magnetic force always acting on the shaft 6. Therefore, noises mainly caused by hitting sounds generated by repetition of contact and non-contact of the shaft 6 with the thrust plate 12, sliding loss caused by lateral sliding of the shaft 6 on the thrust plate 12, and the like can be prevented. The total magnetic force generated by the attracting magnet 13 and the magnet holder 14 serving as the back yoke is set so as to prevent the impeller 2 including the shaft 6 from moving away from the thrust plate 12, i.e., so as not to cause a non-contact state in which the shaft 6 makes no contact with the thrust plate 12. In a case where the fan motor 1 of FIG. 1 is used while being turned upside down from the state of FIG. 1, i.e., in the state in which the axial end of the shaft 6 attached to the impeller 2 is a lower axial end and the other end of the shaft 6 attracted to the attracting magnet 13 is an upper end, for example, the total magnetic force is set to be larger than a load corresponding to a total of a weight of the impeller 2 and an impelling force that is generated by rotation of the impeller 2 and forces the impeller 2 away from the frame 7. In a case where the fan motor 1 is used while being not turned upside down, as in a state shown in FIG. 1, it is enough that the total magnetic force is larger than the impelling force of the impeller 2. In the latter case, even if an axially upward force larger than the total magnetic force is applied to the impeller 2, the above-described shaft-retaining structure formed by the increased thickness portion 2a of the impeller 2 and the projection 9a of the stator 9 prevents the shaft 6 from being removed from the sleeve 8.

The lower end face of the sleeve 8 is in contact with a sleeve side face (an upper face in FIGS. 1 and 2) of the flange 14a of the magnet holder 14. Thus, the magnet holder 14 is held between the lower end face of the sleeve 8 and the bottom portion 7b of the sleeve-retaining portion 7a with which at least the direction, and is also held between the sleeve 8 and the bottom portion 7b of thebottom of the cup-shaped portion 14b of the magnet holder 14 is in contact. Therefore, the magnet holder 14 is restricted from moving axially. That is, the magnet holder 14 is secured within the recess 7c of the sleeve-retaining portion 7a by a pressing force acting in the radial sleeve-retaining portion 7a. In this arrangement, even if the pressing force radially acting is removed for some reason, the magnet holder 14 can be kept secured because the axial movement of the magnet holder 14 is restricted. Thus, troubles caused by the axial movement of the magnet holder 14 can be prevented. As described above, the magnet holder 14 is firmly secured with respect to the sleeve-retaining holder 7a. It is preferable that the sleeve 8 press the flange 14a of the magnet holder 14. However, the sleeve 8 may not apply a pressing force to the flange 14aas long as the sleeve 8 is in contact with the flange 14a.

As described above, magnetically attracting forces always act on between the attracting magnet 13 and the magnet holder 14 and between the attracting magnet 13 and the shaft 6. Therefore, the attracting magnet 13, the magnet holder 14, and the shaft 6 are magnetically attracted toward one another, thereby forming substantially one unit. In a case where the magnet holder 14 is insufficiently fixed, the shaft 6, the thrust plate 12, the attracting magnet 13, and the magnet holder 14 may move upward together and cause movement of the magnet holder 14 away from the sleeve-retaining portion 7a when an axially upward force is applied to the impeller 2. However, the magnet holder 14 is firmly fixed in the above-described manner in the present embodiment. Therefore, the movement of the magnet holder 14 away from the sleeve-retaining portion 7a can be prevented.

The sleeve 8 includes a reduced thickness portion 8b at or near the lower end thereof. An outer diameter of the sleeve 8 is smaller in the reduced thickness portion 8b than in the remaining portion of the sleeve 8. Thus, a ring-shaped space 15 is formed between the outer surface of the reduced-thickness portion 8b and the inner circumferential surface of the sleeve-retaining portion 7a that is opposed to the reduced-thickness portion 8b. The ring-shaped space 15 accommodates a ring-shaped felt piece (lubricant-retaining piece) 16 that contains lubricant of the sleeve 8 therein. The felt piece 16 is in the form of a ring having a slightly larger diameter than that of the ring-shaped space 15. The felt piece 16 is accommodated in the ring-shaped space 15 while being pressed against and in close contact with the outer surface of the reduced-thickness portion 8b that faces the ring-shaped space 15. Due to this arrangement, lubricant is supplied from the felt piece 16 to the sleeve 8. Porosity of the felt piece 16 is sufficiently larger than that of the sleeve 8. Therefore, the use of the felt piece 16 can allow the sleeve 8 to contain more lubricant, making a bearing's life longer.

When being arranged near the bottom portion 7b of the sleeve-retaining portion 7a as described above, the felt piece 16 is trapped deep between the sleeve 8 and sleeve-retaining portion 7a. Therefore, it is hard for the felt piece 16 to move away from the sleeve 8. Also, lubricant leakage hardly occurs. Moreover, if the ring-shaped space 15 is formed from below the sleeve 8, it is possible to easily form the ring-shaped space 15.

Since the sleeve 8 is brought into contact with the flange 14a of the magnet holder 14, the magnet holder 14 can be secured and the sleeve 8 can be positioned appropriately in the axial direction.

The sleeve 8 is provided with the reduced thickness portion 8b in order to ensure a space in which the felt piece 16 is arranged, and is placed in position in the axial direction by contact of its lower end face with the flange 14a of the magnet holder 14. If there is no flange provided in the magnet holder 14, the sleeve 8 is positioned in the axial direction by contact of its lower end face with the bottom portion 7b of the sleeve-retaining portion 7a. In this case, however, a corner of the bottom portion 7b near the opening end of the recess 7c may be rounded when coming into contact with the sleeve 8. Thus, the arrangement including the magnet holder with no flange is not preferable because it does not allow easy positioning of the sleeve 8. On the other hand, the arrangement described in the present embodiment does not cause that trouble in positioning the sleeve 8 in the axial direction. In the present embodiment, to position the sleeve 8 in the axial direction, to fix the magnet holder 14, and to ensure the ring-shaped space 15 for accommodating the felt piece 16 therein can be achieved at the same time.

Most of the lubricant contained in the felt piece 16 is absorbed from a surface of the sleeve 8 toward pores inside the sleeve 8 by a capillary action. A part of the lubricant flows along the outer surface of the cup-shaped portion 14b of the magnet holder 14 or the inner circumferential surface of the sleeve-retaining portion 7a. However, since the sleeve-retaining portion 7a has a cylindrical shape with a closed bottom of the present embodiment, the lubricant does not leak to the outside. Moreover, when the flange 14a of the magnet holder 14 is designed and arranged to cover the felt piece 16, it is possible to prevent the lubricant from leaking to the outside of the magnet holder 14 and flowing on the outer surface of the cup-shaped portion 14b of the magnet holder 14. Furthermore, if the fan motor 1 is used while being upside down from the state of FIG. 1, the lubricant flows away from the bottom portion 7b of the sleeve-retaining portion 7a because of its own weight. Therefore, most of the lubricant contained in the felt piece 16 can be effectively supplied to the sleeve 8.

In general fan motors, rotation of a rotor including an impeller becomes unstable more easily, as compared with other types of motors (including no impeller). This is because an impelling force generated by rotation of the rotor including the impeller is large and a pressure change caused by a factor other than a factor residing in the fan motor easily generates rotation resistance. If those fan motors use a sliding bearing, unstable rotation of the impeller causes the above-described noises and sliding loss for a structural reason of the sliding bearing. Therefore, advantages of the present invention can be effectively utilized when the present invention is applied to fan motors.

Second Preferred Embodiment

Figure 3:
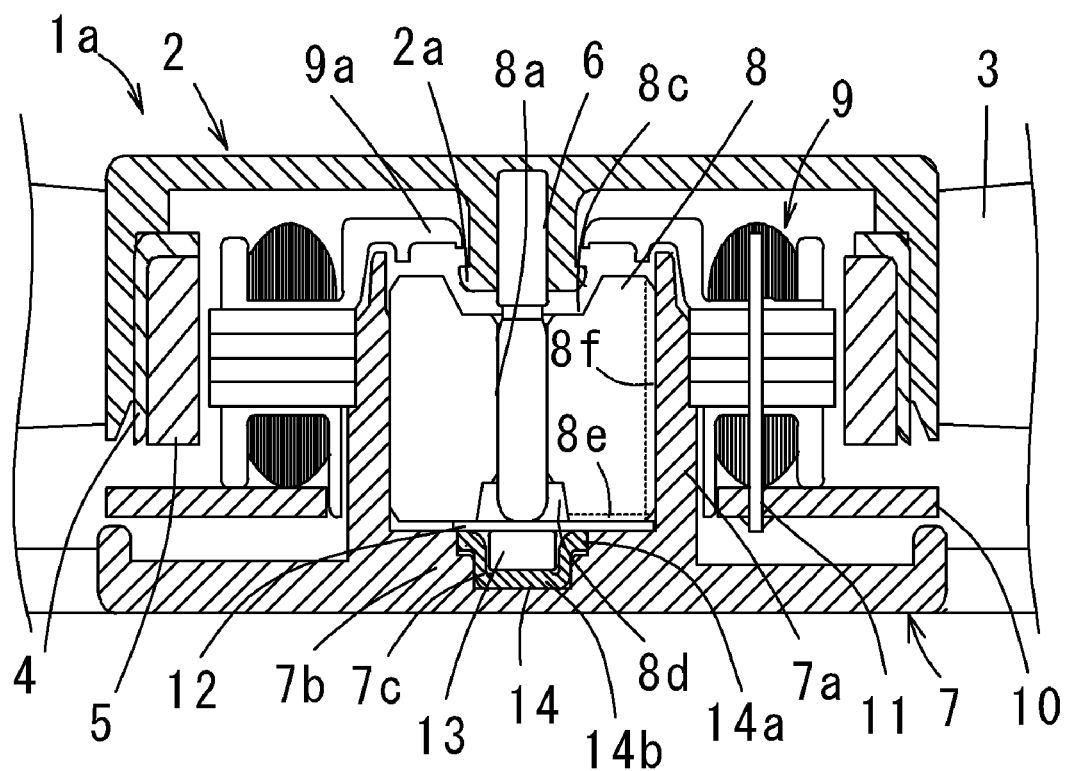
FIG. 3 is a cross-sectional view of a main part of a fan motor according to a second preferred embodiment of the present invention.
Figure 4:
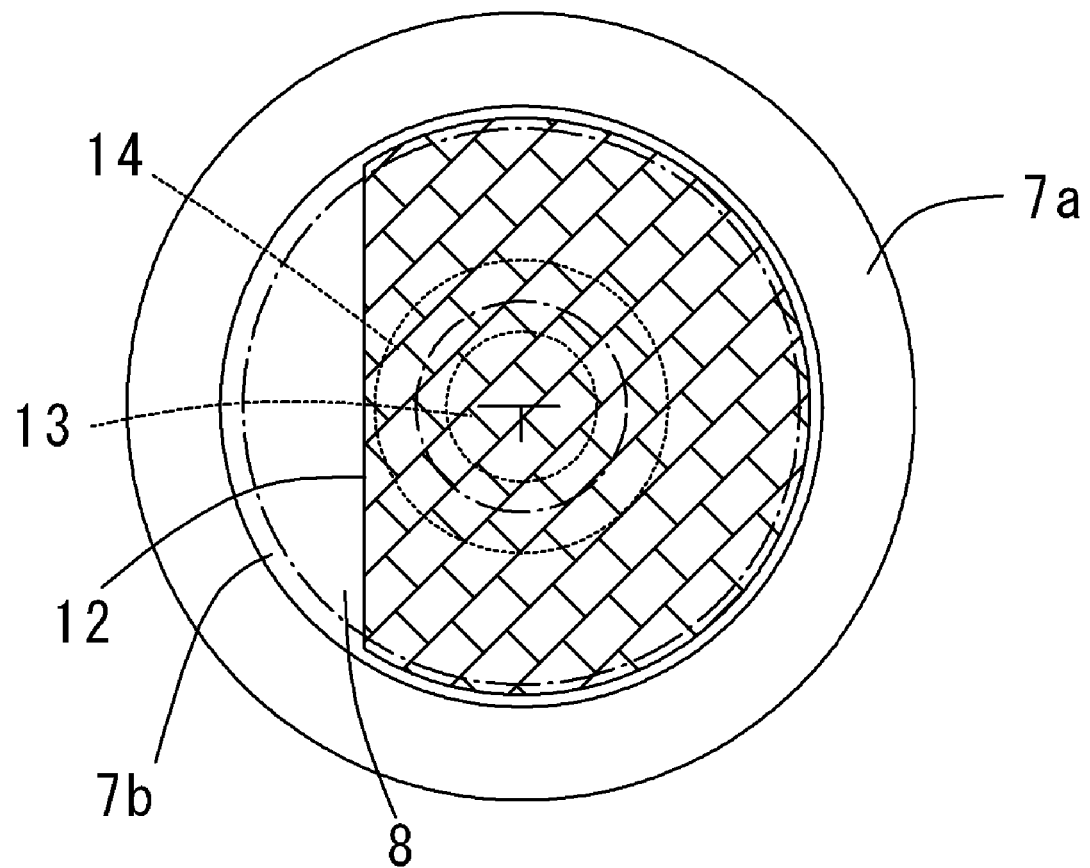
FIG. 4 is a top view of a thrust plate in the fan motor of FIG. 3.

A fan motor 1a according to a second preferred embodiment of the present invention is described referring to FIGS. 3 and 4. FIG. 3 is a cross-sectional view of a main part of the fan motor 1a of the second preferred embodiment. FIG. 4 is a top view of a thrust plate in the fan motor 1a of FIG. 3. In the following description, differences of the second preferred embodiment from the first preferred embodiment are mainly described, because the fan motor 1a is basically the same as the fan motor 1 of the first preferred embodiment.

In the present embodiment, no reduced-thickness portion 8b is formed in the sleeve 8. That is, no felt piece 16 is used. The outer diameter of the sleeve 8 is constant over its entire length in the axial direction. At an upper axial end of the sleeve 8, a ring-shaped concave portion 8c is formed around the through hole 8a. An opening end of the through hole 8a is located in the ring-shaped concave portion 8c. An inner circumferential surface of the ring-shaped concave portion 8c is at an angle with respect to the axial direction in such a manner that an inner diameter of the ring-shaped concave portion 8c increases upward. The ring-shaped concave portion 8c faces the increased thickness portion 2a of the impeller 2 and is open toward the increased thickness portion 2a. The largest inner diameter of the ring-shaped concave portion 8c is sufficiently larger than a largest outer diameter of the increased thickness portion 2a. A lower end of the increased thickness portion 2a is located in the ring-shaped concave portion 8c (that is, a lower end face of the increased thickness portion 2a is located below an upper axial end face of the sleeve 8).

Another ring-shaped concave portion 8d is formed around the through hole 8a at the lower axial end of the sleeve 8. The ring-shaped concave portion 8d has an inner circumferential surface at an angle with respect to the axial direction. The other opening end of the through hole 8a is located in the ring-shaped concave portion 8d. However, a largest inner diameter of the ring-shaped concave portion 8d is sufficiently smaller than the largest outer diameter of the increased thickness portion 2a of the impeller 2. Therefore, an area of the lower end face of the sleeve 8 is larger than an area of the upper end face of the sleeve 8. That is, the sleeve 8 is asymmetric, i.e., has different shapes at both the axial ends.

The thrust plate 12 (corresponding to an intermediate member) is a D-shaped plate that has a profile defined by an arc having substantially the same diameter as the inner diameter of the sleeve-retaining portion 7a and a straight line connecting ends of the arc, as shown with hatching in FIG. 4.

The D-shaped plate is designed to cover at least the magnet holder 14. In the present embodiment, as well as the magnet holder 14, the thrust plate 12 is sandwiched between the sleeve 8 and the bottom portion 7b of the sleeve-retaining portion 7a. The magnet holder 14 is press-fitted and fixed to the bottom portion 7b within the recess 7c with a sleeve side face of the flange 14a arranged in the same plane as at least part of a sleeve side surface of the bottom portion 7b. Moreover, the thickness of the attracting magnet 13 is set to arrange its shaft side surface in the same plane as the sleeve side face of the flange 14a and at least part of the sleeve side face of the bottom portion 7b. In this manner, the thrust plate 12 and the magnet holder 14 are held between the sleeve 8 and the bottom portion 7b of the sleeve-retaining portion 7a. Since the thrust plate 12 is held by the sleeve 8 and the bottom portion 7b of the sleeve-retaining portion 7a a while being sandwiched between them, the thrust plate 12 can be more reliably fixed, as compared with the first preferred embodiment in which the thrust plate 12 is fixed by surface tension of lubricant.

The magnet holder 14 is not only held within the inner surface of the recess 7c of the sleeve-retaining portion 7a by a pressing force acting in the radial direction, but is also held between the sleeve 8 and the bottom portion 7b of the sleeve-retaining portion 7a. Thus, the magnet holder 14 is firmly secured with respect to the sleeve-retaining portion 7a.

When the thrust plate 12 is inserted into the sleeve-retaining portion 7a, a space is formed on a bottom-side of the sleeve-retaining portion 7a. In a case where the space is completely closed, a pressure in this space increases as the thrust plate 12 gets close to the bottom portion 7b of the sleeve-retaining portion 7a. This pressure increase makes insertion of the thrust plate 12 difficult. However, since the thrust plate 12 is D-shaped in the present embodiment, an inner space of the sleeve-retaining portion 7a is not completely closed. Therefore, the thrust plate 12 can be inserted smoothly. The completely inserted thrust plate 12 can cover the magnet holder 14 and be held between the sleeve 8 and the bottom portion 7b of the sleeve-retaining portion 7a at any circumferential position.

Four radially extending horizontal grooves 8e, that extend in the radial direction, are provided on the lower end face of the sleeve 8 at regular circumferential intervals. Four vertically extending grooves 8f, that extend in the axial direction, are provided on the outer circumferential surface of the sleeve 8 to connect with the horizontal grooves 8e, respectively. During insertion of the shaft 6 into the sleeve 8, a pressure in a space formed by the shaft 6 and the bottom portion 7b of the sleeve-retaining portion 7a increases as the shaft 6 gets closer to the bottom portion 7b. This pressure increase makes the insertion of the shaft 6 difficult. However, since the above-described grooves 8f and 8e are provided in the present embodiment, air is discharged to the outside through a passage formed by a respective vertical groove 8f and a corresponding part of the inner circumferential surface of the sleeve-retaining portion 7a and a passage formed by a respective horizontal groove 8e and a corresponding part of a sleeve-side surface of the thrust plate 12. Therefore, the pressure increase is suppressed, allowing smooth insertion of the shaft 6 into the sleeve 8.

Even if an operator inserts the shaft 6 into the sleeve 8 arranged upside down by mistake, the end of the increased thickness portion 2a of the impeller 2 comes into contact with the end face of the sleeve 8 on which the grooves 8e are provided. Thus, the operator can find the mistake in assembly before the fan motor 1a is completed.

Third Preferred Embodiment

Figure 5:
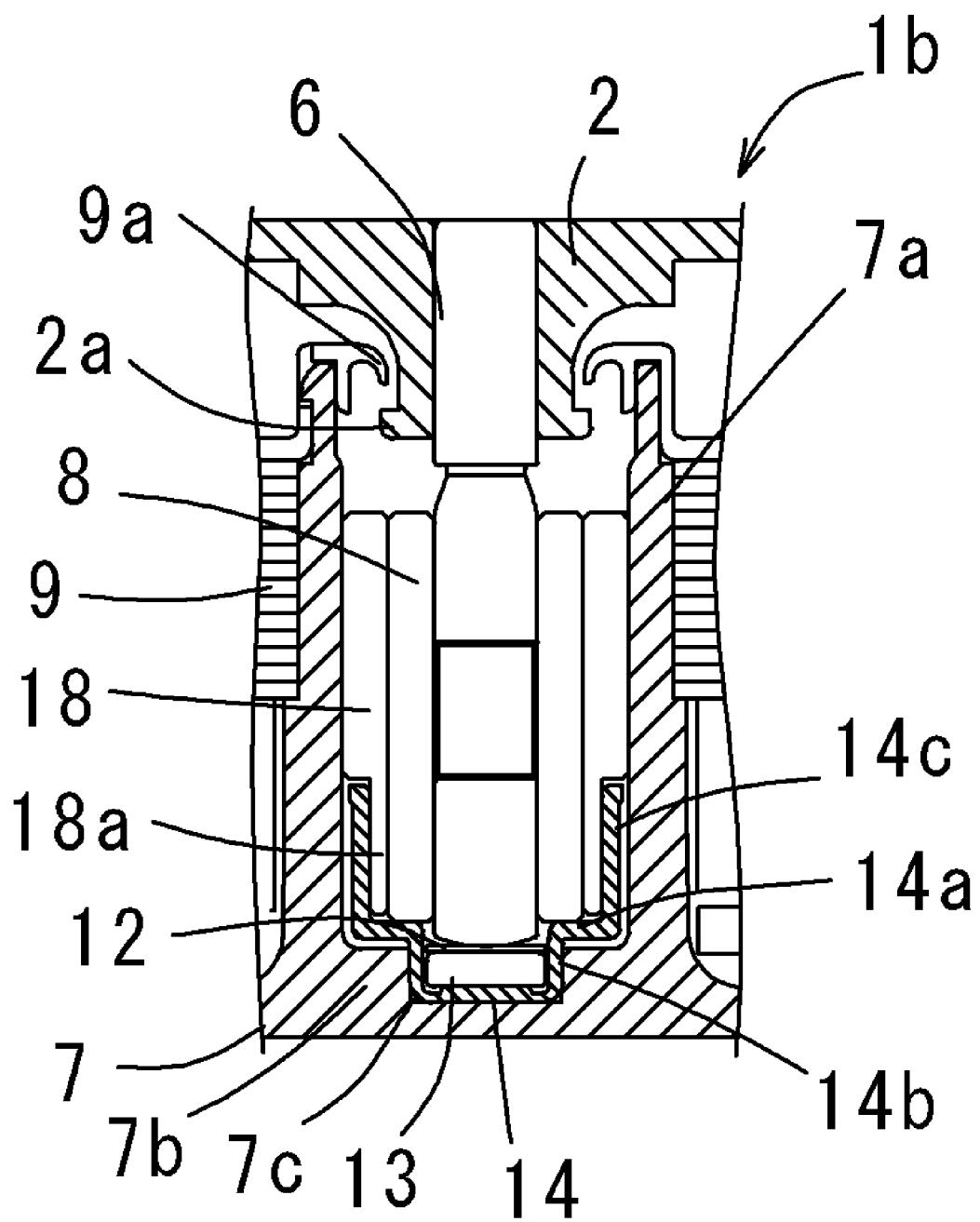
FIG. 5 is a cross-sectional view of a main part of a fan motor according to a third preferred embodiment of the present invention.

A fan motor 1b according to a third preferred embodiment of the present invention is described referring to FIG. 5. FIG. 5 is a cross-sectional view of a main part of the fan motor 1b of the present embodiment. In the following description, differences of the present embodiment from the first preferred embodiment are mainly described.

The sleeve 8 of the present embodiment is not provided with the reduced thickness portion 8b for ensuring the space 15 that accommodates the felt piece 16. That is, no felt piece 16 is provided. Moreover, the sleeve 8 is fixed to the sleeve-retaining portion 7a with a cylindrical sleeve-retaining member 18 sandwiched therebetween. The sleeve-retaining member 18 is provided with a reduced thickness portion 18a having a smaller outer diameter than that of the remaining portion thereof. The reduced thickness portion 18a is arranged near its magnet holder side end, i.e., a lower end. The reduced thickness portion 18a spreads toward its another axial end, i.e., upward from the lower end of the sleeve-retaining member 18 over a predetermined length. The magnet holder 14, that includes the cup-shaped portion 14b for accommodating the attracting magnet 13 therein and the flange 14a extending radially outward from the upper end of the cup-shaped portion 14b, further includes a fitting portion 14c. The fitting portion 14c extends from a radially outer end of the flange 14a along the rotation axis in a direction away from the cup-shaped portion 14b. That is, the fitting portion 14c extends upward from the radially outer end of the flange 14a. The fitting portion 14c is press-fitted into the reduced-thickness portion 18a of the sleeve-retaining member 18.

The fitting portion 14c of the magnet holder 14 is press-fitted and fixed to the outer peripheral surface of the reduced-thickness portion 18a of the sleeve-retaining member 18, so that a lower opening of the sleeve-retaining member 18 is closed with the magnet holder 14. The magnet holder 14 is press-fitted and fixed to the frame 7 within the recess 7c. The sleeve 8 is press-fitted and fixed to an inner peripheral surface of the sleeve-retaining member 18 in such a manner that the lower end face of the sleeve 8 is in contact with the flange 14a of the magnet holder 14. That is, the magnet holder 14 fixed to the recess 7c is in contact with the sleeve 8 at the flange 14a. This arrangement holds the magnet holder 14 between the sleeve 8 and the bottom portion 7b of the sleeve-retaining portion 7a and restricts movement of the magnet holder 14. Therefore, the magnet holder 14 can be firmly fixed with respect to the sleeve-retaining portion 7a.

In the present embodiment, an assembly of the sleeve 8, the sleeve-retaining member 18, the thrust plate 12, the attracting magnet 13, and the magnet holder 14 is carried out in advance. Then, the thus assembled unit is inserted into the sleeve-retaining portion 7a and thereafter the subsequent assembling processes are performed.

Except for the above, the fan motor 1b of the present embodiment is similar to the fan motor 1 of the first preferred embodiment. For example, the thrust plate 12 is accommodated within the cup-shaped portion 14b of the magnet holder 14, as shown in FIG. 5. The total thickness of the thrust plate 12 and attracting magnet 13 is set in the same manner as that in the first preferred embodiment. Therefore, lateral movement of the thrust plate 12 and attracting magnet 13 hardly occurs.

Fourth Preferred Embodiment

Figure 6:
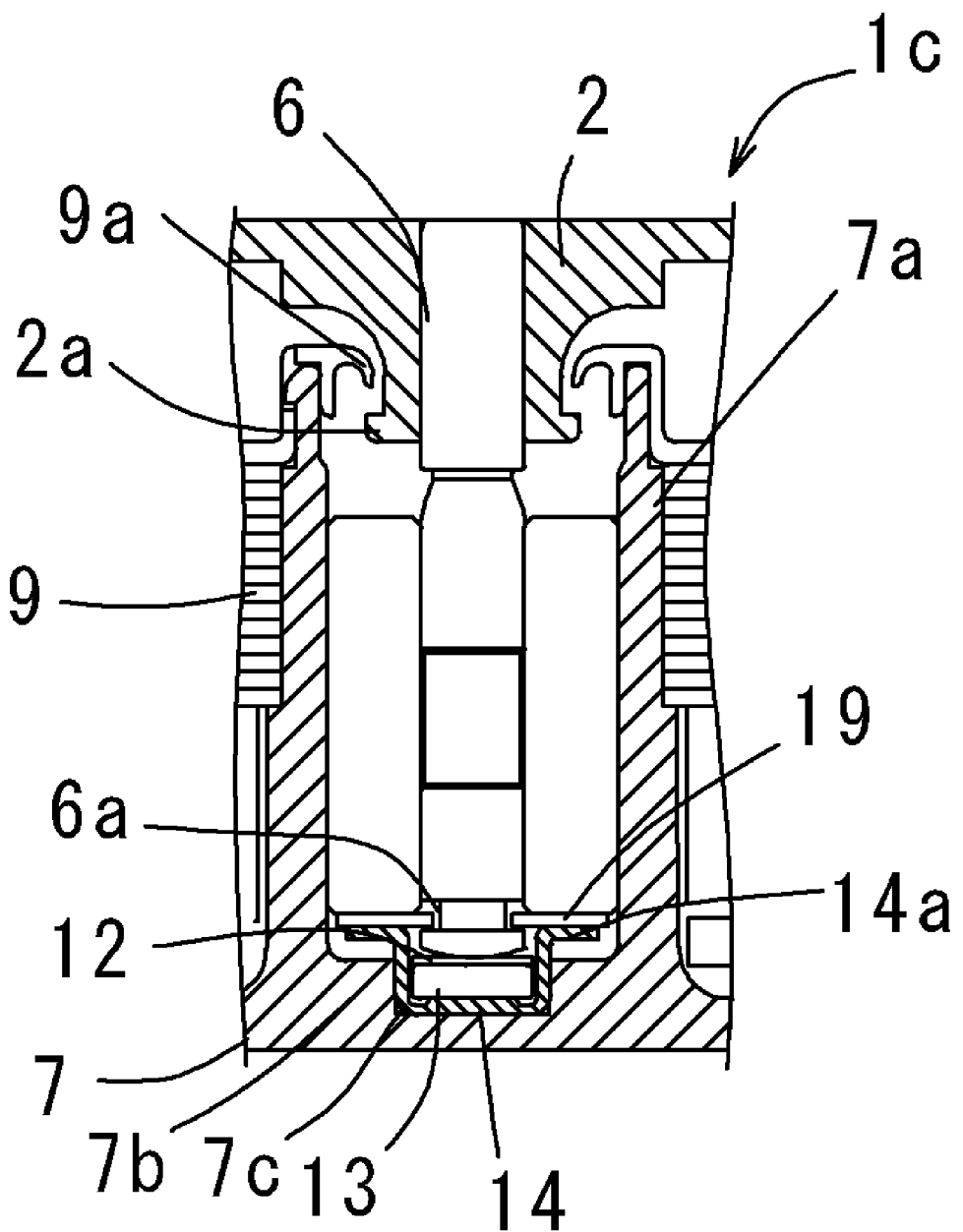
FIG. 6 is a cross-sectional view of a main part of a fan motor according to a fourth preferred embodiment of the present invention.

A fan motor 1c according to a fourth preferred embodiment of the present invention is now described referring to FIG. 6. FIG. 6 is a cross-sectional view of a main part of the fan motor 1c of the present embodiment. In the following description, differences of the present embodiment from the first preferred embodiment are mainly described.

In the present embodiment, in addition to the shaft-retaining structure that prevents movement of the shaft 6 away from the sleeve 8 and is arranged near the upper axial end of the shaft 6, an additional shaft-retaining structure is formed near the lower axial end of the shaft 6. The additional shaft-retaining structure includes a ring-shaped thin plate formed of synthetic resin as a retaining plate 19. The retaining plate 19 is held between the flange 14a of the magnet holder 14 and the lower axial end of the sleeve 8. An inner circumferential portion of the retaining plate 19 is received by a ring-shaped concave portion 6a formed on the outer circumferential surface of the shaft 6 near the lower end of the shaft 6. In this manner, the additional shaft-retaining structure for is formed.

In this structure, the magnet holder 14 is held between the sleeve 8 and the bottom portion 7b of the sleeve-retaining portion 7a via the retaining plate 19 and therefore movement of the magnet holder 14 is restricted. That is, the magnet holder 14 is firmly fixed to the sleeve-retaining portion 7a. In a case where the shaft-retaining structure of the present embodiment is provided near the lower axial end of the shaft 6, the other shaft-retaining structure near the upper axial end of the shaft 6 can be omitted.

In addition, the sleeve 8 is not provided with the reduced thickness portion 8b for ensuring the space 15 that accommodates the felt piece 16, as shown in FIG. 6. That is, no felt piece 16 is provided. The sleeve 8 has a constant diameter over its entire length in the axial direction.

Except for the above, the fan motor 1c of the present embodiment is similar to the fan motor 1 of the first preferred embodiment. For example, the thrust plate 12 is accommodated within the cup-shaped portion 14b of the magnet holder 14, as shown in FIG. 6. The total thickness of the thrust plate 12 and attracting magnet 13 is set in the same manner as that in the first preferred embodiment. Therefore, lateral movement of the thrust plate 12 and attracting magnet 13 hardly occurs.

Fifth Preferred Embodiment

Figure 7:
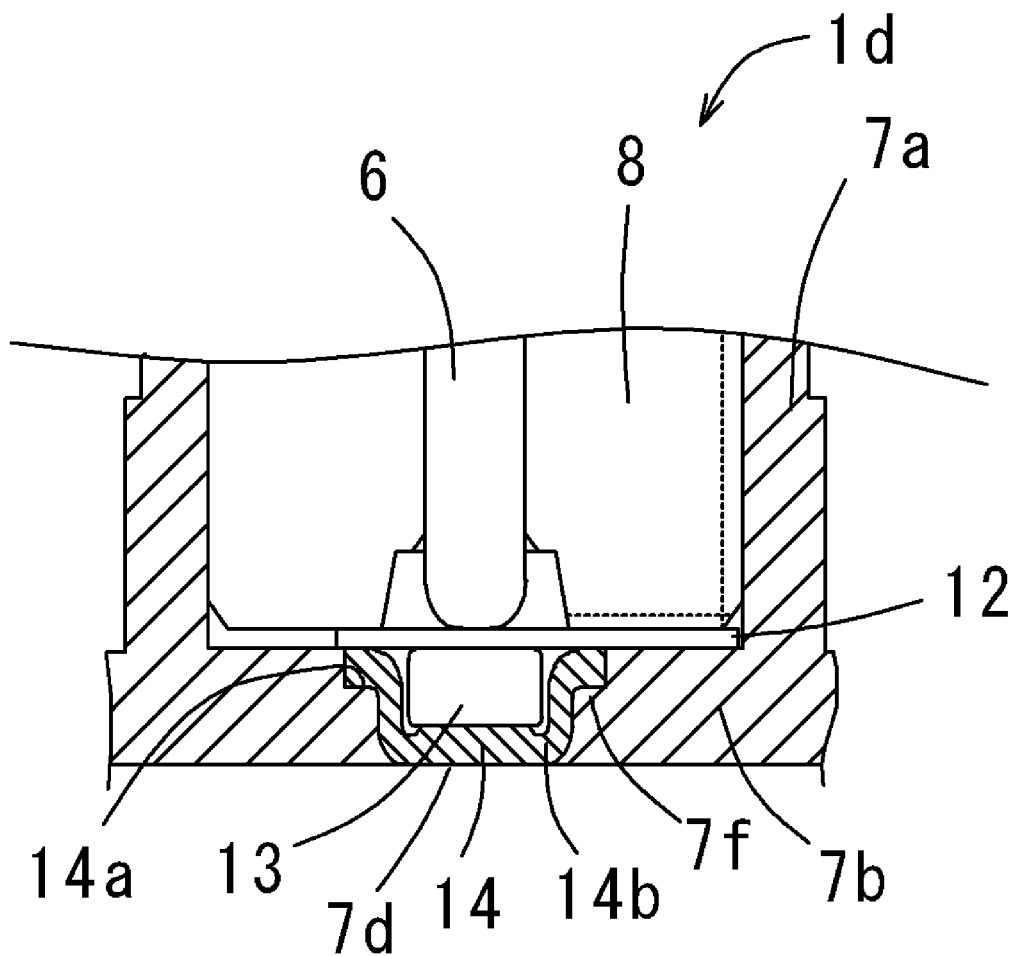
FIG. 7 is a cross-sectional view of a main part of a fan motor according to a fifth preferred embodiment of the present invention.

A fan motor 1d according to a fifth preferred embodiment of the present invention is now described referring to FIG. 7. FIG. 7 is a cross-sectional view of a main part of the fan motor 1d of the present embodiment. In the following description, differences of the present embodiment from the first through fourth preferred embodiments are mainly described.

The present embodiment is different from the first through fourth preferred embodiments in that the bottom of the sleeve-retaining portion 7a is closed with both the bottom portion 7b and the magnet holder 14, not with the bottom portion 7b only. A rear face of the bottom of the cup-shaped portion 14b of the magnet holder 14, which is opposite to a face next to the attracting magnet 13, is uncovered. The bottom portion 7b partly closes the bottom of the sleeve-retaining portion 7a with a hole 7d left at a position below the shaft 6. The hole 7d is closed with the magnet holder 14. The magnet holder 14 is formed by insertion molding with the frame 7. The bottom portion 7b includes a stepped portion 7f at a sleeve-side opening end (i.e., upper opening end) of the hole 7d, so that a diameter of the hole 7d is larger at the sleeve-side opening end than at the other opening end. The magnet holder 14 is received in the hole 7d with the flange 14a fitted on the stepped portion 7f, thereby being positioned in the axial direction. Moreover, the sleeve side face of the flange 14a, the shaft side face of the attracting magnet 13, and the sleeve side face of the bottom portion 7b are arranged in the same plane, as in the second preferred embodiment. The sleeve side face of the flange 14a is in contact with the thrust plate 12 with which the sleeve 8 is in contact. That is, the magnet holder 14 is held together with the thrust plate 12 between the bottom portion 7b of the sleeve-retaining portion 7a and the sleeve 8. Therefore, also in a case where the bottom of the sleeve-retaining portion 7a is not completely closed with the bottom portion 7b, the magnet holder 14 can be firmly fixed.

A manner of fixing the magnet holder 14 to the sleeve-retaining portion 7a is not limited to insertion molding. For example, the magnet holder 14 may be press-fitted, bonded, or welded to the frame 7 that has the same shape as that shown in FIG. 7, i.e., has the sleeve-retaining portion 7a having the bottom that is partly open.

Sixth Preferred Embodiment

Figure 8:
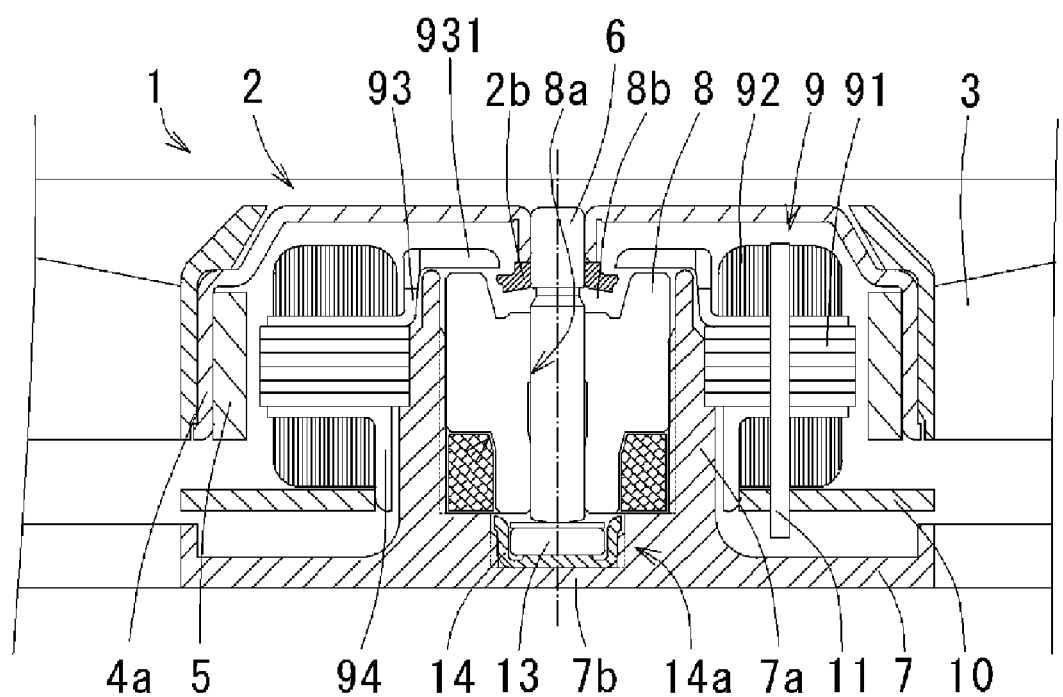
FIG. 8 is a cross-sectional view of a main part of a fan motor according to a sixth embodiment of the present invention.

A motor according to a sixth preferred embodiment of the present invention is now described referring to FIG. 8. FIG. 8 is a cross-sectional view of the fan motor of the sixth preferred embodiment. Since the structure of the fan motor 1 of the present embodiment is similar to that of the first preferred embodiment in many points, differences from the first preferred embodiment are mainly described.

The fan motor 1 includes a rotor and a stator. The rotor includes a shaft 6 rotatable around a rotation axis and arranged along the rotation axis. An impeller 2 is attached to one axial end (an upper axial end in FIG. 1) of the shaft 6 of the rotor. The impeller 2 includes a cup-shaped portion 21 open downward. The impeller 2 is provided with a plurality of blades 3 on an outer circumferential surface of the cup-shaped portion 21 and generates an air flow by its rotation. The rotor also includes a rotor yoke 4a and a cylindrical rotating magnet 5. The rotor yoke 4a is hollow and cylindrical, and is formed of magnetic material. The rotor yoke 4a is open downward and is arranged on an inner circumferential surface of the cup-shaped portion 21. The rotating magnet 5 is arranged on an inner circumferential surface of the rotor yoke 4a. The shaft 6 is press-fitted into the rotor yoke 4a. The upper axial end of the shaft 6 is secured to a center of the rotor yoke 4a.

The fan motor 1 also includes a frame 7 arranged on another axial end side, i.e., a lower axial end side of the shaft 6. That is, the impeller 2 and the frame 7 are arranged on the sides of the shaft 6 in the axial direction, respectively. The frame 7 includes a plate-like portion in the form of a circular plate which is opposed to a lower side of the impeller 2 in the axial direction. The frame 7 also includes a sleeve-retaining portion 7a arranged at a center of the plate-like portion. The sleeve-retaining portion 7a is hollow and cylindrical, has a bottom portion 7b, and extends in the axial direction. A sleeve 8 arranged along the axial direction is press-fitted into and secured to the sleeve-retaining portion 7a. The sleeve 8 is cylindrical and receives the shaft 6 therein. The sleeve 8 and the shaft 7 form a sliding bearing. When assembled, the sleeve 8 is press-fitted into the sleeve-retaining portion 7a and is securely fixed to an inner circumferential surface of the sleeve-retaining portion 7a. The sleeve 8 is formed from porous metal which is obtained by sintering magnetic powders. The porous metal is impregnated with lubricant. The frame 7 is integrally formed with a housing (not shown) that surrounds the impeller 2 to form a passage for an air flow, by molding synthetic resin. The frame 7 may be formed of metal or rigid resin.

The stator 9 is fitted and fixed to an outer circumferential surface of the sleeve-retaining portion 7a. The stator 9 is formed by a stator core 91 including lamination of a plurality of silicon sheets and a coil 92 wound around the stator core 91 with upper and lower insulators 93 and 94 interposed therebetween. The upper and lower insulators 93 and 94 are formed of synthetic resin. The coil 92 is electrically connected to a circuit board 10 arranged below the stator 9 via conductive pins 11. Lead wires (not shown) for electric connection with an external power supply are drawn from the circuit board 10.

At a center of the sleeve 8, a through hole 8a through which the shaft 6 is inserted is formed. A face of the sleeve 8 and a face of the shaft 6 that are opposed to each other form a sliding bearing together. That is, a face surrounding the through hole 8a and an outer circumferential surface of the shaft 6 form a sliding bearing. When the shaft 6 is inserted into the through hole 8a, lubricant contained in the sleeve 8 leaks out of the inner surface of the sleeve 8 and reduces friction between the through hole 8a and the shaft 6. Thus, the shaft 6 is supported to be rotatable relative to the sleeve 8.

Referring to FIG. 8, a ring-shaped member 2b is secured to the shaft 6 near a portion of the shaft 6 that is connected to the rotor yoke 4a. An outer diameter of the ring-shaped member 2b is larger than an inner diameter of a sleeve-retaining member 931 projecting from the stator 9. Therefore, when the shaft 6 is moved axially upward, the ring-shaped member 2b is caught by the sleeve-retaining member 931. In this manner, it is possible to prevent the shaft 6 from leaving the sleeve 8.

At an axial end of the sleeve 8, that is opposite to the magnet-holder side end, a recess 8b is formed to surround the shaft 6. The recess 8b faces the ring-shaped member 2b and is concave away from the ring-shaped member 2b. The ring-shaped member 2b is located in the recess 8b. With this arrangement, lubricant reaching the ring-shaped member 2b through the outer surface of the shaft 6 is scattered outward in the radial direction by centrifugal force acting on the ring-shaped member 2b. The scattered lubricant is then collected in the recess 8b of the sleeve 8. Therefore, it is possible to prevent the lubricant from leaking the outside of the bearing via the shaft 6.

At least a face of the ring-shaped member 2b opposed to the sleeve 8 may be coated with repellent agent that can repel lubricant. In this case, lubricant reaching the coated face of the ring-shaped member 2b is immediately scattered outward in the radial direction. Therefore, effective collection of the lubricant can be achieved.

Moreover, the axial end of the sleeve 8 with the recess 8b formed thereon is also opposed to the sleeve-retaining member 931 in the axial direction with a gap interposed therebetween. The gap is preferably equal to or less than 0.1 mm. Considering a tolerance or the like in manufacturing, an upper limit of an acceptable range of the gap size is about 0.7 mm. Therefore, when the sleeve 8 moves axially upward, i.e., in a direction away from the magnet 13, the upper axial end of the sleeve 8 comes into contact with the sleeve-retaining portion 931 and cannot move further upward. In this manner, the sleeve-retaining member 931 prevents the axial movement of the sleeve 8.

Since the sleeve 8 is press-fitted into and secured to the sleeve-retaining portion 7a, axial movement of the sleeve 8 hardly occurs. However, in a case where the inner circumference of the sleeve 8 may be distorted by press-fit of the sleeve 8 into the sleeve-retaining portion 7a, a difference between the outer diameter of the sleeve 8 and the inner diameter of the sleeve-retaining portion 7a is set to be relatively small. In this case, a retaining force of the sleeve-retaining portion 7a acting on the sleeve 8 also becomes small, and therefore the sleeve 8 may move in the axial direction when a large impact is applied to the fan motor 1 from the outside. However, such movement of the sleeve 8 in the axial direction can be prevented in the present embodiment.

In the present embodiment, the flange 14a extending from the opening end of the cup-shaped portion 14b of the magnet holder 14 is placed on approximately the same plane as the sleeve side face of the bottom portion 7b or at a lower level than the sleeve side face of the bottom portion 7b in the axial direction, unlike the first preferred embodiment. That is, not only the cut-shaped portion 14b of the magnet holder 14 but also the flange 14a are located in the recess 7c in the bottom portion 7b. However, the present embodiment is the same as the first embodiment in that the magnet holder 14 of is arranged between the sleeve 8 and the bottom portion 7b in such a manner that axial movement of the magnet holder 14 is restricted by the sleeve 8 and the bottom portion 7b.

Moreover, the sleeve 8 includes the recess 8b at its upper axial end, and the ring-shaped member 2b forming a part of a shaft-retaining structure is located within the recess 8b. Thus, the axial length, i.e., height of the fan motor 1 can be reduced. In addition, a space in the fan motor 1 can be effectively used while a volume of the bearing is ensured.

In the above description, the preferred embodiments of the present invention have been described referring to fan motors. However, the present invention is not limited thereto. It would be apparent to those skilled in the art that the present invention can be modified in various ways.

For example, the magnet holder 14 in the first through fourth preferred embodiments is press-fitted and fixed to a part of the sleeve-retaining portion 7a. However, fixing of the magnet holder 14 may be achieved by other fixing techniques, for example, bonding or insertion molding together with the sleeve-retaining portion 7a.

In the above preferred embodiments, the magnet holder 14 is fixed directly to the the bottom portion 7b of the sleeve-retaining portion 7a of the frame 7 by press fitting, bonding, or insertion molding. However, it is not always necessary to fix the magnet holder 14 within the recess 7c directly to the bottom portion 7b of the sleeve-retaining portion 7a of the frame 7.

In the above preferred embodiments, the attracting magnet 13 is arranged to directly magnetically attract the shaft 6. However, the structure for magnetically attracting the shaft 6 is not limited thereto. For example, in a case of using a shaft 6 formed of non-magnetic material, a ring-shaped member formed of magnetic material is attached to a lower axial end (i.e., an attracting magnet side end) of the shaft 6. In this manner, a similar structure as that described in the above can be achieved.

The motors of the respective preferred embodiments are fan motors. However, the present invention can be applied to various types of motors, e.g., motors for rotating a disk-shaped storage medium or motors for rotating a color wheel for presenting color images. Each of motors to which the present invention is applied may include a stator and a magnet for causing rotation that are opposed in the axial direction.

As described above, according to the preferred embodiments of the present invention, the magnetically attractive force always acts on between the attracting magnet and the magnet holder and between the attracting magnet and the shaft, so that the attracting magnet, the magnet holder, and the shaft are magnetically attracted to each other to form a substantially integral part. Therefore, when a load is applied to the shaft in a direction away from the attracting magnet, that load is also applied on the magnet holder in the same direction (i.e., in a direction away from the sleeve-retaining portion). However, the magnet holder is firmly secured, because it is held between the sleeve and a predetermined portion of the sleeve-retaining portion.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
    a rotor including a shaft rotatable around a rotation axis;
    a stator that faces the rotor;
    a sleeve arranged along the rotation axis and receiving the shaft, a face of the sleeve and a face of the shaft that are opposed to each other forming together a bearing supporting the rotor in a rotatable manner relative to the stator;
    a sleeve-retaining portion arranged along the rotation axis to retain the sleeve and having a cylindrical portion, and bottom portion closing an end of the cylindrical portion, the bottom portion defining a recess in an interior surface thereof that faces and is opposed in an axial direction to an axial end of the sleeve;
    an attracting magnet opposed to an axial end of the shaft and magnetically attracting the axial end of the shaft; and
    a magnet holder comprising a cup-shaped member having a closed bottom and an open top, the cup-shaped member of the magnet holder being accommodating the attracting magnet; and wherein:
    the axial end of the sleeve is opposed in the axial direction to a respective portion of the magnet holder, and the cup-shaped member of the magnet holder is disposed in the recess in the interior surface in the bottom portion of the sleeve-retaining portion such that the bottom portion of the sleeve-retaining portion is opposed in the axial direction to the bottom of the cup-shaped member of the magnet holder, whereby the sleeve and the bottom portion of the sleeve-retaining portion together restrict axial movement of the magnet holder.

2. The motor according to claim 1, wherein:
    the bottom portion of the sleeve-retaining portion has a recess that accommodates the magnet holder therein; and
    the magnet holder has a flange extending from open top of the cup-shaped member, the flange being opposed in the axial direction to the axial end of the sleeve.

3. The motor according to claim 2, wherein the flange of the magnet holder is in contact with the axial end of the sleeve to position the sleeve in a direction parallel to the rotation axis.

4. The motor according to claim 2, wherein:
    a shaft side face of the attracting magnet, a sleeve side face of the flange of the magnet holder, and
    at least part of a sleeve side face of the bottom portion of the sleeve-retaining portion are arranged in the same plane.

5. The motor according to claim 2, further comprising an intermediate plate arranged between the flange of the magnet holder and the axial end of the sleeve.

6. The motor according to claim 5, wherein the intermediate plate is a thrust plate on which the axial end of the shaft is slidable.

7. The motor according to claim 5, wherein:
    the intermediate plate is a retaining plate; and
    the shaft is provided with a reduced-thickness portion near the axial end thereof, an outer diameter of the shaft being smaller in the reduced thickness portion than in a remaining portion thereof, the reduced thickness portion receiving the retaining plate to form a structure that restricts axial movement of the axial end of the shaft in a direction away from the attracting magnet.

8. The motor according to claim 2, further comprising:
    an interposed member arranged along the rotation axis between the sleeve and the sleeve-retaining portion; wherein:
    the interposed member is provided with a reduced thickness portion at its axial end next to the bottom portion of the sleeve-retaining portion, an outer diameter of the interposed member being smaller in the reduced thickness portion than in a remaining portion thereof; and
    the magnet holder further includes a fitting portion that extends from the flange toward another axial end of the interposed member, the fitting portion being fitted into the reduced thickness portion of the interposed member.

9. The motor according to claim 1, further comprising a thrust plate arranged between the attracting magnet and the axial end of the shaft.

10. The motor according to claim 9, wherein the thrust plate is accommodated in the magnet holder.

11. The motor according to claim 9, wherein the thrust plate covers the attracting magnet and at least a part of a sleeve side face of the bottom portion of the sleeve-retaining portion.

12. The motor according to claim 1, wherein the sleeve is formed from porous metal containing lubricant therein.

13. The motor according to claim 12, further comprising a lubricant-retaining piece that contains the lubricant therein and is arranged to be in close contact with the sleeve.

14. The motor according to claim 13, wherein:
    the sleeve is provided with a reduced thickness portion at or near the axial end thereof, an outer diameter of the sleeve being smaller in the reduced thickness portion than in a remaining portion thereof, the reduced thickness portion of the sleeve and the sleeve-retaining portion forming a space therebetween; and
    the lubricant-retaining piece is accommodated in the space.

15. The motor according to claim 14, further comprising:
    a sleeve-retaining member preventing the sleeve from leaving the sleeve-retaining portion; wherein:
    the sleeve-retaining portion has an opening end, the opening end and the bottom portion of the sleeve-retaining portion constituting opposite ends of the sleeve-retaining portion in the axial direction, and
    the sleeve has an opening end, the opening end of the sleeve and the axial end of the sleeve facing the bottom portion of the sleeve-retaining portion constituting opposite ends of the sleeve in the axial direction; and
    the sleeve-retaining member is provided at the opening end of the sleeve-retaining portion and is a opposed in the axial direction to the opening end of the sleeve with a gap interposed therebetween.

16. The motor according to claim 15, wherein the gap between the sleeve-retaining member and the opening end of the sleeve is equal to or less than 0.7 mm.

17. The motor according to claim 15, wherein:
the stator includes a stator core, a coil wound around the stator core, and an insulator interposed between the stator core and the coil; and
the sleeve-retaining member and the insulator are continuously formed.

18. The motor according to claim 15, wherein:
the stator includes a stator core, a coil wound around the stator core, and an insulator interposed between the stator core and the coil; and
the sleeve-retaining member and the insulator are integrally formed with each other.

19. The motor according to claim 15, wherein the sleeve is provided with a recess at its opening end, the recess surrounding the shaft.

20. The motor according to claim 19, further comprising:
a ring-shaped member secured on an outer surface of the shaft; wherein:
the recess faces the ring-shaped member and is concave away from the ring-shaped member; and
at least a part of the ring-shaped member is located in the recess of the sleeve.

21. The motor according to claim 20, wherein:
the sleeve-retaining member is ring-shaped and has an inner diameter smaller than an outer diameter of the ring-shaped member; and
the ring-shaped member is arranged between the sleeve-retaining member and the sleeve in a direction parallel to the rotation axis.

22. The motor according to claim 14, further comprising:
a sleeve-retaining member preventing the sleeve from leaving the sleeve-retaining portion; wherein:
the sleeve-retaining portion has an opening end, the opening end and the bottom portion of the sleeve-retaining portion constituting opposite ends of the sleeve-retaining portion in the axial direction, and
the sleeve has an opening end, the opening end of the sleeve and the axial end of the sleeve facing the bottom portion of the sleeve-retaining portion constituting opposite ends of the sleeve in the axial direction; and
the sleeve-retaining member is provided at the opening end of the sleeve-retaining portion and is in contact with the opening end of the sleeve.

23. The motor according to claim 1, further comprising:
a shaft-retaining structure arranged near another axial end of the shaft; wherein: the shaft-retaining structure includes a first portion formed around the other axial end of the shaft and a second portion arranged outside the first portion in a radial direction perpendicular to the rotation axis, the second portion extending from an end of the stator toward the first portion, the first and second portions capable of preventing movement of the shaft away from the magnet holder by engaging with each other when the shaft moves away from the magnet holder.

24. The motor according to claim 1, further comprising an impeller attached to another axial end of the shaft and generating an air flow by its rotation.

25. The motor according to claim 1, wherein the shaft is formed of magnetic material.

26. The motor according to claim 1, wherein the shaft is formed of non-magnetic material, and a magnetic member formed of magnetic material is attached to the axial end of the shaft.

27. The motor according to claim 1, wherein the magnet holder is formed of magnetic material and enhances a magnetic force of the attracting magnet.

28. The motor according to claim 27, further comprising:
an impeller attached to a lower axial end of the shaft and generating an air flow by its rotation; wherein:
an upper axial end of the shaft is magnetically attracted by the attracting magnet; and
a total magnetic force provided by the attracting magnet and the magnet holder is larger than a load corresponding to a total of a weight of the impeller and an impelling force generated by the rotation of the impeller.

* * * * *